(12) United States Patent
Strauss et al.

(10) Patent No.: US 6,282,930 B1
(45) Date of Patent: Sep. 4, 2001

(54) DEAD-BOLT OPERATED STEERING WHEEL LOCK

(76) Inventors: Richard L. Strauss, 680 Guy Lombardo Ave., Freeport, NY (US) 11520; Alex Nyirucz, 81-40 249th St., Bellrose, NY (US) 11426

( * ) Notice: Subject to any disclaimer, the term of this patent is extended or adjusted under 35 U.S.C. 154(b) by 0 days.

(21) Appl. No.: 09/575,425

(22) Filed: May 22, 2000

(51) Int. Cl.[7] ................................................. B60R 25/02
(52) U.S. Cl. .............................. 70/209; 70/226; 70/237
(58) Field of Search ........................... 70/209–212, 225, 70/226, 237, 238

(56) References Cited

U.S. PATENT DOCUMENTS

| 4,738,127 | | 4/1988 | Johnson | 70/209 |
|---|---|---|---|---|
| 4,856,308 | | 8/1989 | Johnson | 70/209 |
| 4,935,047 | | 6/1990 | Wu | 70/209 |
| 4,970,884 | | 11/1990 | Solow | 70/209 |
| 5,014,529 | | 5/1991 | Wu | 70/209 |
| 5,031,428 | * | 7/1991 | Jan et al. | 70/209 |
| 5,092,146 | * | 3/1992 | Wang | 70/209 |
| 5,121,617 | * | 6/1992 | Chen | 70/209 |
| 5,142,889 | * | 9/1992 | Liu | 70/209 |
| 5,157,951 | * | 10/1992 | Chen et al. | 70/209 |
| 5,165,264 | * | 11/1992 | Chen | 70/209 |
| 5,179,849 | * | 1/1993 | Wang | 70/209 |
| 5,199,283 | * | 4/1993 | Chen | 70/209 |
| 5,211,041 | * | 5/1993 | Hsu | 70/209 |
| 5,327,753 | * | 7/1994 | White | 70/209 |
| 5,471,855 | * | 12/1995 | Wu | 70/209 |
| 5,566,561 | * | 10/1996 | Hucknall | 70/209 |
| 5,713,228 | | 2/1998 | Huang | 70/209 |
| 5,836,185 | * | 11/1998 | Openiano | 70/209 |
| 5,875,661 | | 3/1999 | Ho | 70/209 |

* cited by examiner

*Primary Examiner*—Suzanne Dino Barrett
(74) *Attorney, Agent, or Firm*—Richard L. Strauss, Esq

(57) ABSTRACT

A diametric style steering wheel lock is disclosed having improved strength and resistance to forced removal, while, at the same time, demonstrating increased ease in actual use. The steering wheel lock utilizes an enclosed and protected dead bolt locking system providing positive and powerful diametric fixation of the device across a vehicle steering wheel. Although dead bolt operation is employed, the device demonstrates free rotation of one or both steering wheel rim engagement means facilitating placement of the device. In addition, the steering wheel lock advantageously incorporates longitudinally aligned adjustment and locking grooves located upon the surface of the locking rod to provide quick, keyless application of the lock including, extension, contraction and rotation further facilitating positioning thereof. Push-to-engage means as well as automatic dead bolt engagement is disclosed in the disclosed embodiments.

16 Claims, 7 Drawing Sheets

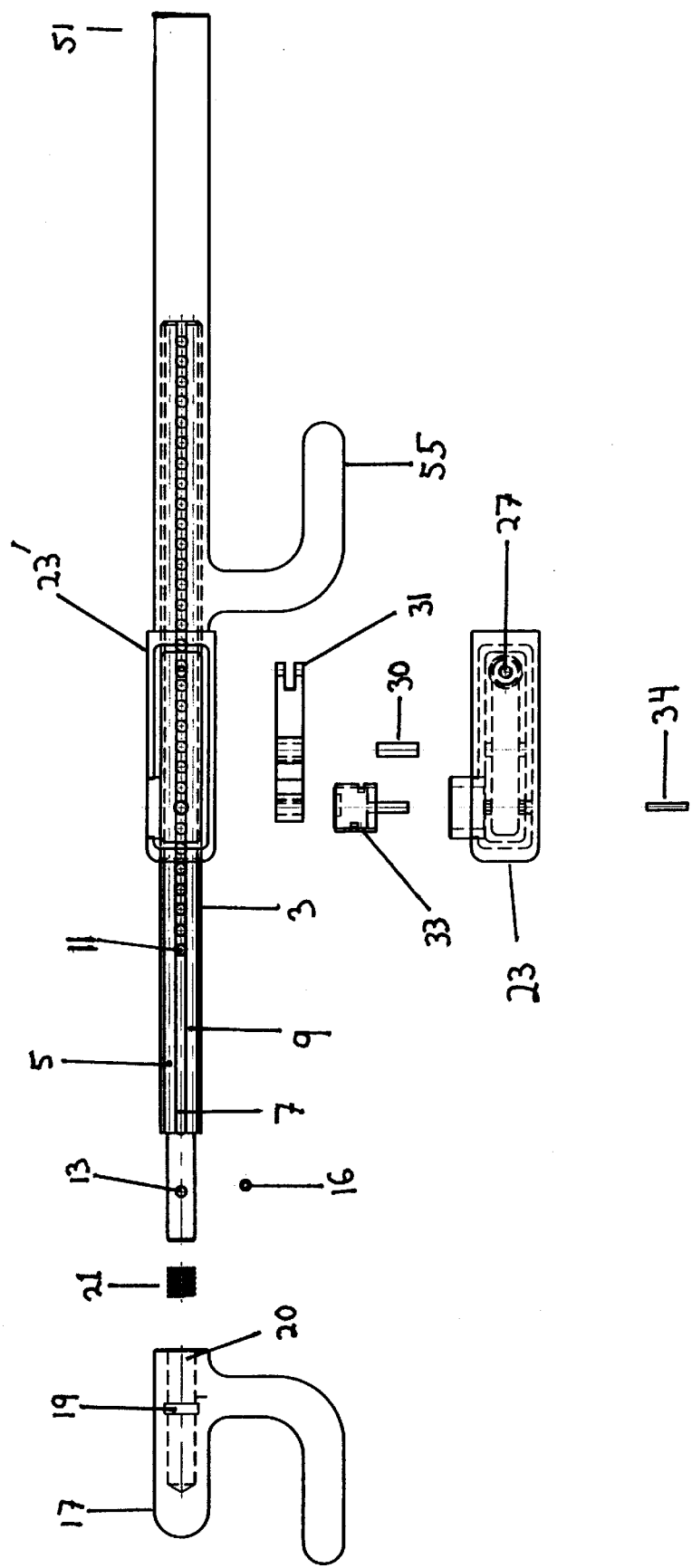

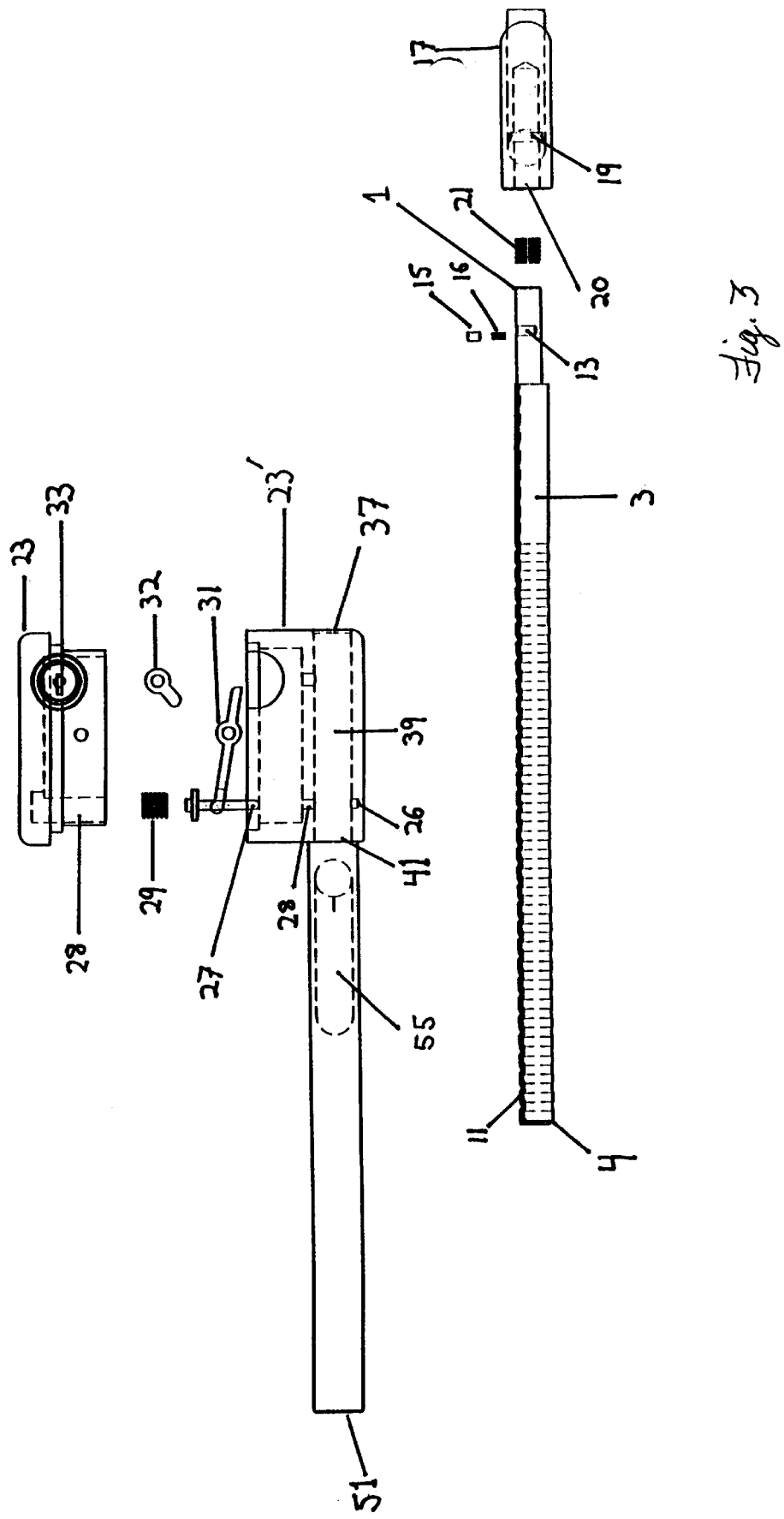

DEAD-BOLT OPERATED STEERING WHEEL LOCK

FIELD OF INVENTION

The present invention relates to the field of automobile anti-theft devices. More specifically, the present invention relates to diametric type steering wheel anti-theft devices.

BACKGROUND OF THE ART

It has long been known to utilize external steering wheel lock devices in order to prevent unauthorized operation of the vehicles protected thereby. These devices provide protection by locking on to, or across a steering wheel and, as described below, thereby limit rotation of the wheel to a degree well below that necessary to successfully maneuver and/or operate a subject vehicle.

Steering wheel locking devices may be described as belonging to one of two major categories. The first category includes steering wheel locks designed to limit steering wheel rotation and brake/gas pedal operation by locking the wheel rim to either of said pedals. The second category of steering wheel locks which may be referred to as, for example, diametric locks, generally comprise a bar that is locked—to the steering wheel alone—with at least one end of the bar extending a substantial distance from the steering wheel rim. The extended bar prevents full rotation by coming into contact with the vehicle windshield, dashboard or other non-movable structures located circumferentially about the steering wheel to which it is affixed.

In the past, diametric steering wheel lock devices, such as that disclosed in U.S. Pat. No. 4,103,524 to Mitchell, et al., (the "'524 patent") have comprised a rather simple one piece rigid bar of fixed length having hooks located thereupon for engaging portions of a steering wheel rim. Located between the hooks and slidably affixed to the rigid bar, a locking device is provided that may be positioned and locked so as to effective capture a portion of the steering wheel rim. The device is placed diametrically across a steering wheel with a terminal portion of the bar extending well beyond the rim, thereby limiting wheel rotation. To its disadvantage, the length of this device is fixed. Due to the fact that the operation of this lock requires significant extension of the bar beyond the wheel, this device is, by inherent design, a long and unwieldy apparatus which is accordingly cumbersome to utilize and difficult to store.

U.S. Pat. No. 4,304,110 to Fain discloses an adjustable, diametrically placed steering wheel lock. This device discloses, in one embodiment, a two piece bar having a rim engaging hook on one such bar, and a pair of steel lugs mounted upon the other bar. The device is configured so that the bars are matingly threaded and adapted so as to allow one bar to be received coaxially within the other. This configuration allows the device to be disassembled into two short sections for easier storage while also allowing accurate placement of the device upon a steering wheel. In addition this device utilizes a padlock to securely lock the device to the rim. However, the threaded system of adjustment is both slow and cumbersome. In addition, the exposed padlock may be easily defeated with a bolt cutter or hack saw.

The rather cumbersome means required to adjust the length, or disassemble the steering wheel lock disclosed by U.S. Pat. No. 4,304,110 are vastly improved upon by the device disclosed in UK patent application GB 2039840A to Lewis. This device advantageously utilizes two bars. Each such bar is provided with a steering wheel engagement hook for engagement of a steering wheel rim from within. The disclosed rods are slidably adapted in a coaxial manner so as to allow rapid adjustment in the distance between the hooks. Thus the disclosed device is capable of rapid adjustment in length along a longitudinal axis. In addition, the '110 application discloses the use of lock holes, bored through both bars, especially configured and adapted for the use of a padlock for securing the device upon a steering wheel. Although the bolt like locking system utilized by this device is inherently strong the padlock is highly exposed and thus easily defeated by means of a hack saw or bolt cutter. In addition, because this device utilizes a padlock to pass completely through the bars, rotation of the disclosed engagement hooks attached to the bars is not possible thereby increasing the difficulty of engaging a steering wheel rim.

U.S. Pat. No. 4,738,127 to Johnson discloses steering wheel lock comprised of an elongated hollow tube having a hook for engagement of a steering wheel rim from inside its circumference. The elongated hollow tube exhibits a length sufficient so as to extend well beyond the rim when engaged thereto. An elongated rod member, having a hook located at one terminus thereof for engaging a diametric portion of steering wheel rim from the inside and opposite that engaged by the hook of the hollow tube is disclosed especially configured and adapted to slidably engage the inside of the hollow tube in a manner similar to that disclosed by the '110 application. The rod is provided with multiple annular grooves about its circumference. A locking means, associated and affixed to the hollow tube, is provided and operates to lock the axial position of the tube and bar by engaging a portion of said annular groove with a pawl-like locking means. This configuration is highly advantageous in that the annular ring/pawl lock system allows rotation of the bar and attached rim engaging hook for greater ease in lock placement. However, the paw- like locking means disclosed engages only a fraction of the diameter of the rod it is intended to secure. In addition, the device disclosed by the '127 patent requires a key in order to engage and disengage the device from a steering wheel.

The limitations of the steering wheel lock disclosed by the '127 patent are partially overcome by U.S. Pat. No. 4,935,047 ("'047"). This patent discloses a device, substantially similar to that disclosed in the '127 patent, but including a more convenient locking means. The device, in a locked configuration, allows axial extension of the hollow tube and rod relative to each other—but not contraction—. Therefore, the device may be extended and engaged upon a steering wheel without the use of a key even when locked. However, once extended, the device can not be collapsed for re-positioning without a key in such a locked condition. In addition, if, during storage, the device is unintentionally extended, it may not be utilized without use of a key. Although the device disclosed in the '047 patent offers greater ease of placement, it is limited by the use of the same pawl and annular ring locking engagement disclosed in the '127 patent which only engages a small portion of the rod. In addition, the device can only be extended in the locked position limiting full adjustment during placement unless a key is Steering wheel locks heretofore disclosed have suffered from easily defeated locking means. Those devices utilizing relatively heavy-duty external padlocks may provide positive dead bolt-like strength but are subject to instant defeat of such exposed locks by use of bolt cutters. Those devices utilizing enclosed, but relatively fragile internal pawl locks, are easily defeated by the use freezing agents, such as Freon, brute force, or the combination thereof.

Even superior steering wheel locks are worthless if they are not utilized. Thus it is imperative to provide a steering wheel lock requiring minimal time, effort and/or skill for manipulation and placement without fumbling for keys.

What is needed is a diametric-type steering wheel lock demonstrating the inherent dead bolt strength of padlock designs while, at the same time, preventing access to such locking means. In addition, it would be highly advantageous if said device provided full rotation of engagement hooks for ease of placement, and, at the same time, offered keyless operation allowing both extension and retraction of the device during placement.

SUMMARY OF THE INVENTION

Now, in accordance with the present invention, an improved steering wheel lock is disclosed wherein increased resistance to forcible removal and increased eased of placement is provided.

In a first preferred embodiment of the present invention, a steering wheel locking device is disclosed comprised of a lock rod, a lock rod rim engagement means, an extension rod, and a locking module.

The lock rod defines a longitudinal axis, a medial terminus and a distal terminus. A plurality of circumferentially aligned dead bolt receiving holes are located diametrically through the lock rod. The bolt receiving holes are positioned so that each adjacent hole is a uniform and consistent distance from each other. A locking groove, demonstrating a diameter slightly greater than that of the receiving holes, is located along the surface and length of the lock rod, said locking groove being tangential and centric to the bolt receiving holes on one side of said rod and aligned with the longitudinal axis thereof. In addition to the lock groove, the lock rod may advantageously include at least one adjustment groove located parallel and adjacent to the indexing groove.

A steering wheel rim engagement means is located upon and joined to the distal terminus of the lock rod in such a manner and by such means as to allow a full 360 degree circumferential rotation of said engagement means in relation to the axis of the lock rod. The rim engagement means may be advantageously shaped, for example, in a hook or u-shape for engagement of a steering wheel rim from within the circumference thereof.

The lock module is comprised of a lock housing, dead bolt, dead bolt extension means, dead bolt retraction means and keyed lock cylinder. The lock housing is advantageously fabricated of a high strength steel and configured in the general shape of, for example, a rectangular box having a top, bottom, front, back and two sides. Extending from and integral with one side of the lock housing is an extension rod.

The lock housing also includes a lock rod receiving port, a lock rod bore, and a lock rod exit port, each of such ports and bore defining substantially the same bore diameter and being in centric alignment. The ports and bore comprise a complete passage from one side of the housing to an opposite side. The passage provided by the ports and bore is located centric and adjacent to a central bore located within the extension rod. The lock rod bore and exit/receiving ports and the central bore of the extension rod are advantageously configured to demonstrate a diameter slightly larger than the diameter of the lock rod so as to provide smooth receipt and pass through of the lock rod through the lock housing and coaxial receipt within the extension rod.

The extension rod may be advantageously adapted for rotatable mounting upon the lock housing and includes a rim engagement means as an integral part thereof. The engagement means is advantageously located adjacent a longitudinal axis of the rod and may be configured, for example, in a hook-like form for engagement of a steering wheel rim from within the circumference thereof. In certain embodiments of the present invention, it may be preferable to position the rim engagement means, ordinarily affixed to the extension rod, directly to the lock housing. In such embodiments, the diametric portion of the steering wheel otherwise engaged by the engagement means affixed to the extension rod, is engaged by a similar means affixed directly to the lock housing. Such configurations allow the use of dead bolt locking mechanisms that require relatively large housings. Such larger housings include greater dimensions between lock rod exit and entrance ports in turn increasing the minimal distance between rim engagement means attainable by the device upon maximum retraction of the lock bar through the extension rod and lock housing. In order to provide for engagement of steering wheels with minimal circumference, a rim engagement means positioned directly upon the lock housing reduces the above-described minimal inter-engagement means distance.

Within the lock housing, a dead bolt is provided and positioned perpendicular and adjacent to the lock rod bore. The dead bolt is so oriented by means of a bolt operation bore within which it is confined, said bore also being located perpendicular and with one end adjacent to the lock rod bore, an extension of said operation bore being located as a continuation thereof on an opposite side of said lock rod bore. A spring is located within the bolt operation bore adjacent to a distal end thereof opposite to a proximal end adjacent the lock rod bore. The spring is biased against the dead bolt in such a manner and to such a degree as to urge the dead bolt in the absence of resistance, to pass completely through and transect the full diameter of the lock rod bore, the dead bolt remaining partially within the operation bore and extending partially into the extension thereof on the opposite side of said lock rod bore in order to provide full dead bolt locking security.

In order to utilize the steering wheel lock of the present invention, the medial terminus of the locking rod must be passed through the lock rod receiving port, lock rod bore, lock rod exit port and coaxially through the central bore of the extension rod. In preparation for passing the lock rod through the lock module and extension rod, the adjustment groove of the lock rod is first be aligned with the spring-loaded dead bolt which, in this particular embodiment, also serves as an indexing means. After such alignment, it is necessary to utilize the keyed cylinder to first operate the bolt retraction means so as to withdraw the bolt completely from the lock rod bore to allow entry of the lock rod.

Once the bolt has been withdrawn, the locking rod may be inserted through the receiving port and lock rod bore so that the adjustment groove is aligned with the path of the bolt. Thereafter, upon release of the key operating the cylinder, the bolt operation spring urges the dead bolt through and beyond the dead bolt operation bore and against the adjustment groove allowing free axial movement of the locking rod within the lock housing along a longitudinal axis of the lock rod.

In order to place the steering wheel lock of the present invention on a steering wheel, the lock rod is first urged through the lock rod bore and coaxially through the extension rod so as to minimize the distance between the rim engagement means. Thereafter, a portion of steering wheel rim is engaged, from within its circumference, by the steering wheel engagement means affixed and located adjacent to the extension rod. Engagement of the rim thereby is greatly facilitated by embodiments of the present invention utilizing the rotatably mounted extension rod and engagement means integral thereto. The locking rod is then extended, axially, so as to allow capture of an inner diametric portion of steering wheel rim opposite that captured by the rim engaging means affixed to the extension post. The freely rotating engagement means of the lock rod, present in all embodiments, facilitates rapid and effortless placement thereof.

Since the dead bolt is biased within the adjustment groove by the bolt operation spring, the position and overall length of the device may be continually adjusted by extending and retracting the lock rod so until a satisfactory position is achieved. The device is most advantageously positioned upon the steering wheel in such a manner as the extension post comes into contact with obstacles, such as the vehicle windshield, dashboard or console, upon rotation of the steering wheel and the engagement means both having captured and secured diametric portions of steering wheel rim.

Once such a suitable position is obtained, the lock rod is rotated, about its longitudinal axis, until the dead bolt is aligned and within the locking groove. Thereafter, slight extension or contraction of the unit allows the dead bolt, biased against the surface of the locking groove by the bolt spring, to align with, and drop completely through a dead bolt receiving hole located proximal to the position of the dead bolt with the locking groove. The bolt bore and rod bore are configured so that the dead bolt, in a locked position, passes completely through the locking rod, engaging walls of the bolt bore on both sides of the locking rod. Thus the device, having been engaged and locked diametrically across a steering wheel rim and having been positioned so that a distal portion of the extension rod comes into contact with solid objects—such as a vehicle windshield or dashboard—prevents operation of the vehicle to which it has been affixed.

The dead bolt locking means utilized by the present invention provides positive, highly tamper resistant strength of prior devices utilizing padlocks, while, at the same time, placing the locking bolt in an unexposed, protected location within the lock housing. Also, the adjustment groove/locking groove configuration allows both extension and retraction of the device during placement without the need to utilize a key. Once ideal placement length is discovered, a simple twist of the lock rod allows the self-indexing design to lock. In addition, despite the fact that the bolt transects the entire diameter of the lock rod preventing lock rod rotation, the rotatable steering wheel engagement means of the present invention maintain hook rotation for ease of the device. Also, the automatic indexing function provided by the dead bolt and dead bolt operation spring, allow for rotation of the lock bar itself prior to locking the device. Therefore, the present invention provides a steering wheel lock, highly resistant to forcible removal, while, at the same time, providing increased ease of installation.

In a second preferred embodiment of the present invention, the dead bolt utilized to securely lock the locking rod of the present invention into a fixed axial position is operated by means of a push-to-engage type locking device. In such embodiments of the present invention, the dead bolt operation bore provided for the dead bolt within the lock housing is contiguous with a larger bore configured to receive a push-to-engage lock. Within said extended bore, a push-to-engage lock, comprised of a locking cylinder, spring and sheath is positioned. The sheath is permanently affixed to the walls of the bore so that one end of the sheath, opposite to that proximate the dead bolt, is substantially flush with an outside surface of the lock housing. The push-to-engage lock cylinder, within said sheath, is ordinarily biased out, away from within said sheath by an internal lock spring in an unlocked position. A set pin prevents the cylinder from complete extrusion from the sheath. At a proximal terminus of the cylinder, proximate to the dead bolt, a means is provided for fixation of the dead bolt, axially and centric to the cylinder. At an opposite distal terminus of the cylinder, facing away from the dead bolt, a key way for keyed operation is provided. Rotation of a key inserted within the key way unlocks and retracts the lock cylinder, and affixed dead bolt, away from the lock rod bore.

Embodiments of the present invention utilizing a push-to-engage locking cylinder require only a locking groove and do not require an adjustment groove. The push-to-engage lock, in the unlocked position, utilizes an internal spring to bias the cylinder, and affixed dead bolt, away from the lock rod bore as well as the bolt receiving holes when they are positioned therewithin. Therefore, when the push-to-engage lock is in the unlocked position, the lock rod may freely move through the lock rod bore—and in the case of the second preferred embodiment, through the extension rod—. Embodiments utilizing a push-to-engage lock advantageously include, within the lock housing, an indexing bore located adjacent and circumferentially aligned with the dead bolt bore. The distance between the indexing bore and dead bolt bore is selected to be equal to the distance between adjacent dead bolt receiving holes of the lock rod. Within the indexing bore, an indexing pin, with a diameter slightly less than that of the locking groove, and slightly greater than that of the dead bolt receiving holes is positioned adjacent the lock rod bore at a proximal terminus of the indexing bore. An indexing spring is also located within the indexing bore at a distal terminus thereof and positioned so as to urge the pin towards the lock rod bore. A stop is provided at a proximal terminus of the indexing bore adjacent to the lock rod bore so as to prevent escape of the indexing pin into the lock rod bore.

In operating embodiments of the present invention utilizing push-to-engage locks, the medial terminus of the lock rod is passed through the lock rod receiving port, lock rod bore, exit port and through the central bore of the extension rod. Placement of the locking rod into and through the housing requires the push-to-engage lock to be in the open position, the cylinder and dead bolt affixed thereto retracted away from the lock rod bore. However, the lock rod must first be aligned in the lock rod bore so that the locking groove is aligned with the indexing pin (and thus dead bolt operation bore.) Thereafter, the lock rod can be retracted in line with the longitudinal axis of the rod and through the housing so as to provide minimal distance between the rim engagement means. The steering rim is then engaged, from within its circumference, by the rim engagement means integral with the extension rod. The lock rod, whose dead bolt receiving holes are held in circumferential alignment with the dead bolt bore by the alignment function provided by the indexing pin and locking groove, may then be extended so as to allow engagement of a diametric portion of the steering wheel by the rim engagement means affixed thereto. Upon achieving engagement of the rim, the lock rod is axially extended and retracted a short distance so as to allow the indexing pin to partially drop into an aligned receiving hole. Thereafter, the push to engage lock cylinder is depressed driving the dead bolt through the locking rod for secure locking thereof. The steering wheel lock is thus securely locked to the steering wheel.

Embodiments of the present invention utilizing push-to-engage lock cylinders exhibit all of the advantages of the present inventions ease of use and dead bolt security while, at the same time, allowing the use of a smaller lock housing.

BRIEF DESCRIPTION OF THE DRAWINGS

FIG. 2 is a top view of the steering wheel locking device of the first preferred embodiment of the present invention.

FIG. 3 is a side view of the steering wheel locking device of the first preferred embodiment of the present invention.

DETAILED DESCRIPTION OF THE INVENTION

Figure 1A:
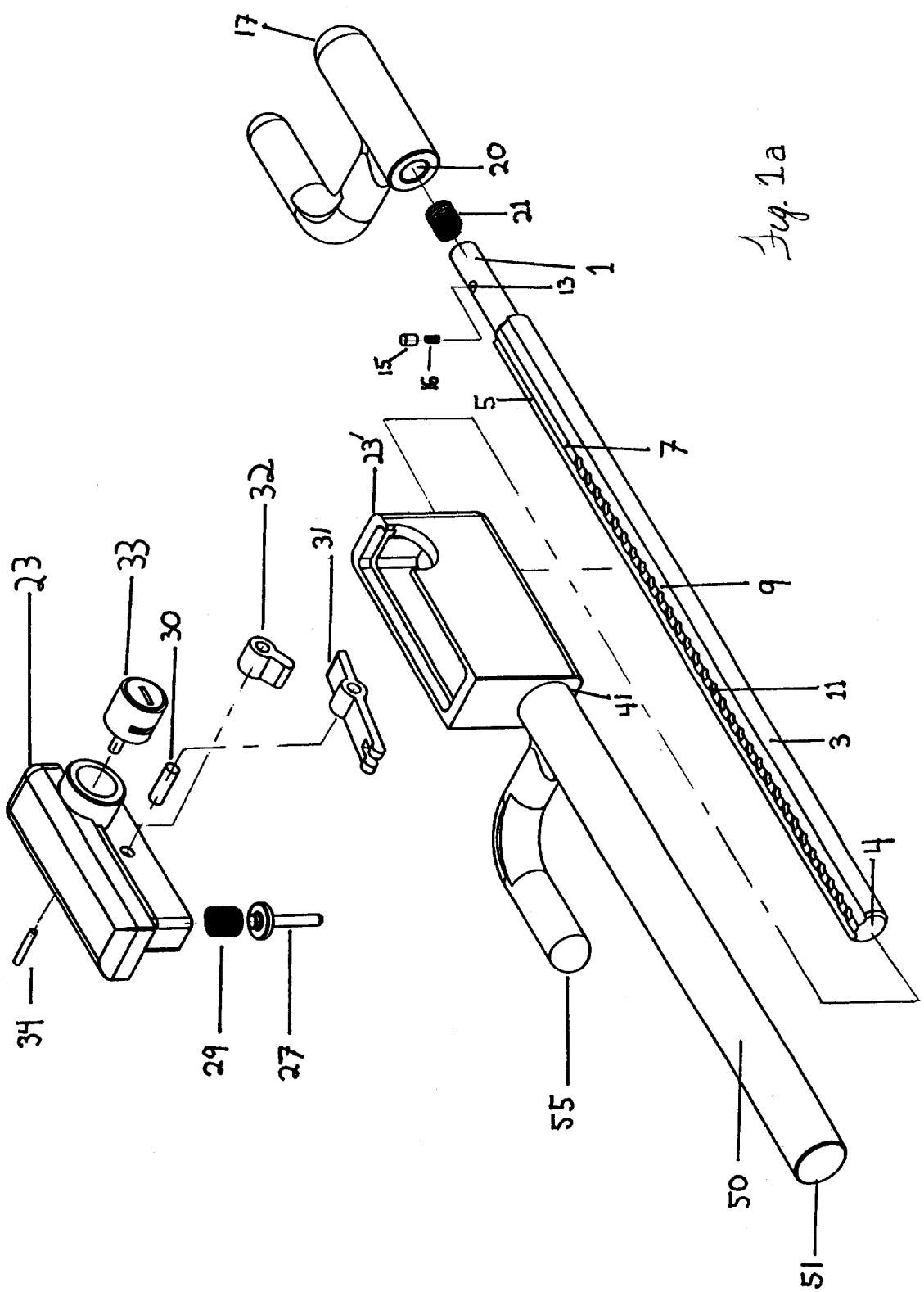
FIG. 1a is an exploded view of the steering wheel locking device of the first preferred embodiment of the present invention.
Figure 1B:
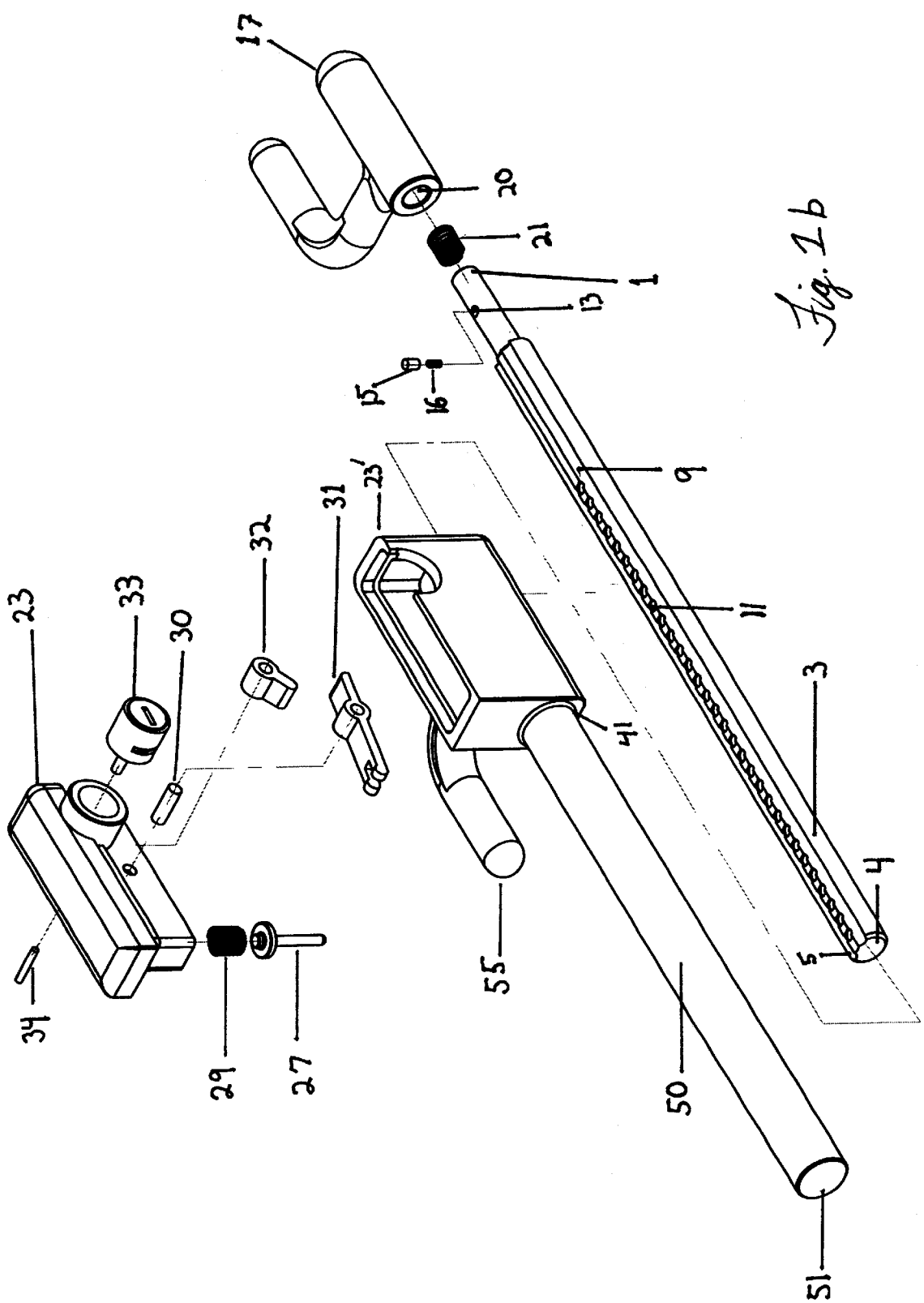
FIG. 1b is an exploded view of the steering wheel locking device of the first preferred embodiment of the present invention with a rim engagement means affixed directly to the lock housing.

FIG. 1a illustrates an exploded view of an example of a first preferred embodiment of the present invention. FIGS. 2 and 3 illustrate top and side views, respectively. Adjustment grooves 5 and 9, and locking groove 7 are each aligned along a longitudinal axis of lock rod 3 are both parallel and equidistant in relation to one another. Lock rod 3 is advantageously formed of a high strength steel alloy demonstrating superior hardness such as, for example, a chrome-steel alloy. Within lock grove 7, a plurality of dead bolt receiving holes 11 are positioned. Each adjacent receiving hole 11 forms a complete bore running diametrically through lock rod 3 and is located a consistent and equal distance, one from another. The receiving holes are located, at one terminus, centric and within the relatively greater diameter of locking groove 7—as compared to the relatively lesser diameter of the dead bolt receiving holes. Each receiving hole 11, at its intersection with the surface of the locking rod, is advantageously chamfered in order to facilitate dead bolt engagement as well as to minimize the possibility of entrapment of skin during lock manipulation. Adjacent to the distal terminus 1 of the lock rod 3, a portion of said lock rod defines a relatively lesser diameter, as compared to the remainder of the lock rod. Within the reduced diameter of the rod, an assembly pin receiving bore 13 is provided for location of assembly pin 15. The bore 13 is open, at one terminus, at the surface of said lock rod, and closed at an opposite terminus. The assembly pin receiving bore is selected to have a diameter just slightly greater than assembly pin 15. An assembly pin spring 16 is provided and is positioned between the closed terminus of the assembly pin receiving bore and the pin. The assembly pin spring acts, in the absence of resistance, to urge the pin out from within the confines of the assembly pin receiving bore and beyond the surface of the lock rod. Rim engagement means 17 may be advantageously configured, for example, in a "u" shape or any other shape providing for engagement of a steering wheel rim from within its circumference. The rim engagement means includes, with in central bore 20 thereof, a circumferentially aligned assembly pin seating groove 19. At a proximal terminus of said rim engagement means, the central bore 20 functions as a lock rod receiving bore and thus exhibits a diameter slightly greater than that of the distal terminus of lock rod 3. The central bore 20 of the rim engagement means is centrically aligned and especially configured and adapted to allow coaxial assembly of the rim engagement means upon the lock rod. The seating groove and assembly pin are also especially configured and aligned so that, upon coaxial assembly of the distal portion of the lock rod within the central bore of the engagement means, pin 15 engages and is contained within groove 19 thereby providing 360 degrees of longitudinal rotation of said engagement means relative to said lock rod.

In preparation for such coaxial assembly of the rim engagement means 17 upon the distal terminus 1 of the lock rod 3, assembly pin 15 is first fully depressed within the confines of its respective receiving bore thereby presenting no extension beyond the surface of the lock rod. Thereafter, upon seating of the proximal portion of said rim engagement means 17 upon the distal terminus 1 of the locking rod 3, the assembly pin 15 seats within the assembly pin seating groove 19 located within the centrically aligned bore of rim engagement means 17 so as to provide fixation of the rim engagement means to the locking rod, while simultaneously allowing 360 degree rotation thereof. The 360 degree freedom of rotation facilitates ease in engagement of the steering wheel rim. A spring 21 may be advantageously included and located between the distal terminus of the locking rod 3 and the rim engagement means so as to provide some resistance and control of excessive "free" spinning of the engagement means. The rim engagement means 17 is also, advantageously formed of a high strength steel alloy. It is also advantageous to provide an elastic coating upon said means in order to minimize marring of the steering wheel.

Lock module 25 is comprised of a two section housing 23 and 23'. The lock module houses a dead bolt 27, a dead bolt extension spring 29, a dead bolt retraction lever 31, lever pin 30, cam 32, cam rod 34, and keyed lock cylinder 33. The lock housing may be configured, for example, in the shape of a rectangular box having a top, bottom, front, back and a right and left side sections. The housing may be advantageously selected to be fabricated of a high strength steel or steel alloy. Lock rod receiving port 37, continuous with lock rod bore 39 and lock rod exit port 41 define a circular bore demonstrating a diameter slightly greater than that of locking rod 3 configured and adapted to facilitate introduction and pass through of the locking rod through the lock module and, as discussed below, through a bore located within an extension rod aligned therewith.

Extending from and integral with one side of the lock housing is an extension rod 51. The extension rod is advantageously configured to extend a sufficient distance from said housing so as to provide an interference function with fixed objects within the vehicle such as, for example, a vehicle dash board, wind shield or console. Lock rod 3 and extension rod 51 are centrically as well as axially aligned. Within extension rod 51 a central bore 50 is provided demonstrating a diameter, substantially the same as lock rod receiving port 37, lock rod bore 39 and lock rod exit port 41. Thus, a continuous bore defined by the lock receiving port, lock rod bore, exit port and the central bore of the extension rod, in combination, define a passage through which lock rod 3 may pass. Thus the first preferred embodiment provides for a coaxial relationship between the lock rod and extension rod wherein the lock rod may be retracted into and through the bore of the extension rod thereof. A rim engagement means 55 is located upon, an integral with extension rod 51. The engagement means may be configured, for example, in a "hook-like" shape so as to facilitate engagement of a steering wheel rim from within said rims diameter. In FIG. 1a, rim engagement means 51' is advantageously affixed directly to the lock housing so as to provided reduced inter-rim engagement means distance upon coaxial retraction of the lock bar into the extension rod. Such configurations are highly advantageous in allowing placement of the device on steering wheels exhibiting minimal rim diameter.

Within the lock housing, a dead bolt 27 is provided and positioned perpendicular and adjacent to the lock rod bore 39. The dead bolt 27 is so oriented and positioned by means of a bolt operation bore 28 within which it is confined, said bore also being located perpendicular and with one end open and adjacent to the lock rod bore. In direct line with, and as an extension of said dead bolt operation bore, a small extension bolt extension bore 26 is located as a continuation thereof on an opposite side of said lock rod bore. A bolt extension spring 29 is advantageously located within the bolt operation bore adjacent to the distal terminus of the dead bolt. The spring 29 is biased against the dead bolt in such a manner and to such a degree as to urge the dead bolt, in the absence of resistance, to pass through and completely transect the full diameter of the lock rod bore, the dead bolt remaining thereafter, partially within the operation bore 39, and extending partially into the extension 26 thereof.

A keyed cylinder 33 is advantageously mounted within the lock housing so that a key-way is provided on the front surface thereof. The keyed cylinder is especially configured and adapted to operate cam 32. A dead bolt retraction lever 31 is provided within the lock module and is positioned by means of pivot pin 30 for engagement of cam 32 at one terminus thereof and the dead bolt 27 at an opposite terminus. Although, as described above, the dead bolt, in the absence of resistance, ordinarily transects the lock rod bore, operation of the keyed cylinder rotates cam 32 which engages and pivots dead bolt retraction lever 31 about pin 30. The terminus of the bolt retraction means in contact with the dead bolt, then engages and retracts the dead bolt completely from the lock rod bore.

Prior to use of the steering wheel lock of the first preferred embodiment, the medial terminus 4 of the lock rod is urged through receiving port 37, through lock rod bore 39 and out exit port 41 as far as possible so as to minimize the distance between the two rim engagement means. Prior to introduction of the lock rod into the lock rod bore, the rod is positioned so that either of the adjustment grooves thereon is aligned with the spring-loaded dead bolt and dead bolt bore. In order to introduce the lock rod into the lock module, the keyed cylinder must be utilized to withdraw the dead bolt completely from the lock housing bore. Once the bolt has been so withdrawn, the locking rod may be inserted in such a manner so as to align either of the adjustment grooves with the dead bolt operation bore.

Upon release of the bolt retraction means via release of torsion applied to a key operating the keyed cylinder, the bolt is biased against the adjustment groove in a "ready position" allowing free axial movement of the locking rod within the lock housing along a longitudinal axis.

In order to utilize the steering wheel lock of the present invention, a steering wheel rim is engaged, from within its radius, by the steering wheel engagement means affixed and located adjacent to the extension rod. Thereafter, the locking rod is extended along its longitudinal axis, relative to the lock housing, so that it may engage, from within, a diametric portion of the rim. With the dead bolt biased within either of the adjustment grooves, the position and overall length of the device may be continually adjusted until a satisfactory position is achieved. The device is most advantageously positioned upon the steering wheel in such a manner as the extension rod comes into contact with obstacles, such as the vehicle windshield, dashboard or console, upon rotation of the steering wheel. Since the rim engagement means mounted upon the lock rod demonstrates 360 degrees of rotation, engagement of the rim is greatly facilitated—despite the fact that a dead bolt will be used to lock the device—.

Once a suitable position is obtained, the lock rod is rotated, about its longitudinal axis, until the dead bolt is aligned with the locking groove. Thereafter, slight extension or contraction of the lock rod relative to the lock housing allows the dead bolt, biased against the surface of the locking groove the bolt spring, to align with, and drop completely through a bolt receiving hole located proximal to the position of the dead bolt within the locking groove. The bolt and housing are advantageously configured so that the bolt, in a locked position, passes completely through the locking rod, engaging walls of the bolt bore on both sides of the locking rod. Thus the first preferred embodiment of the present invention provides high security with dead bolt operation passing completely through and securing the lock rod while simultaneously providing the rotational advantages of pawl-type locks which offer only partial lock engagement.

Figure 4:
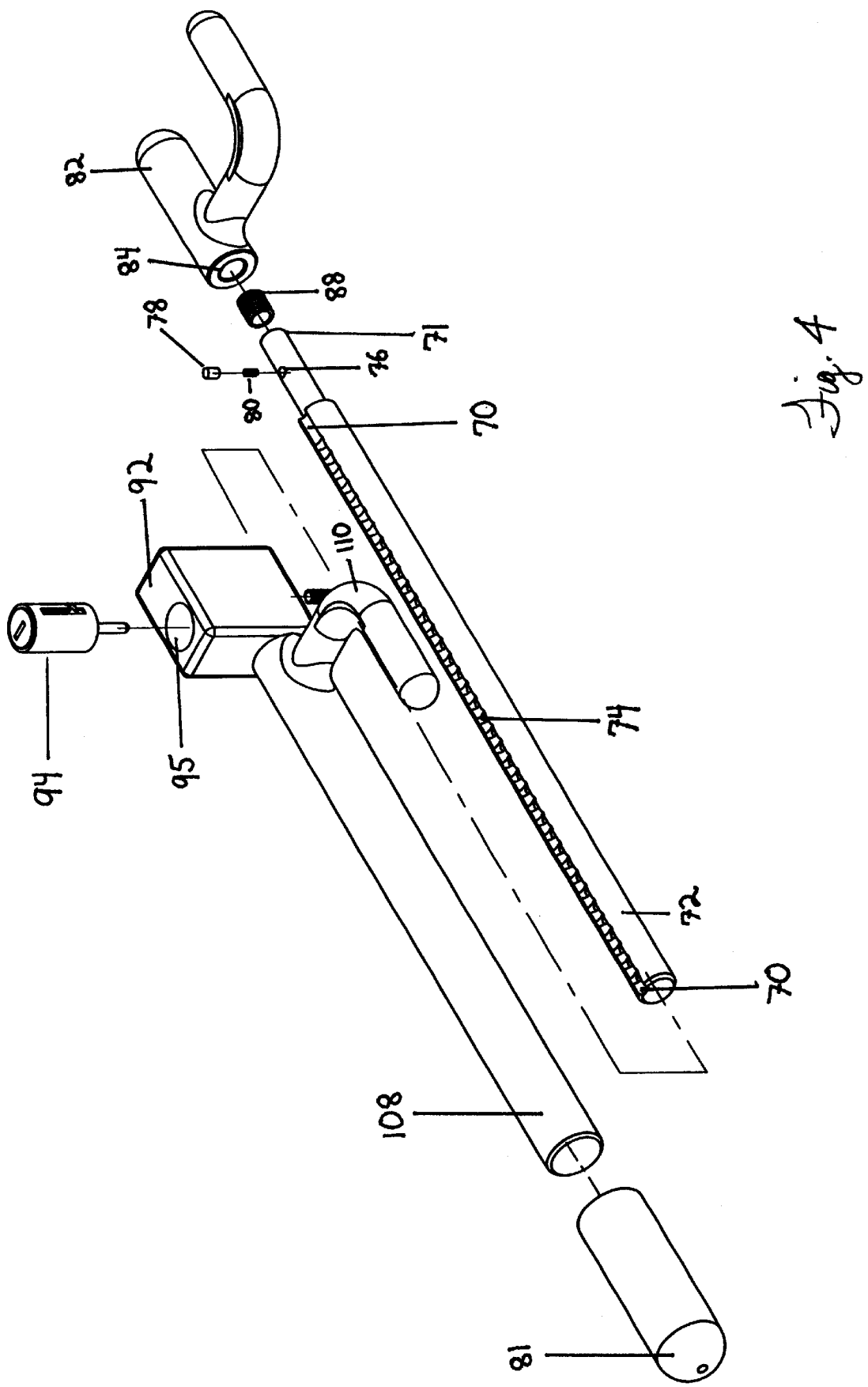
FIG. 4. is an exploded view of the steering wheel locking device of the second preferred embodiment of the present invention.
Figure 5:
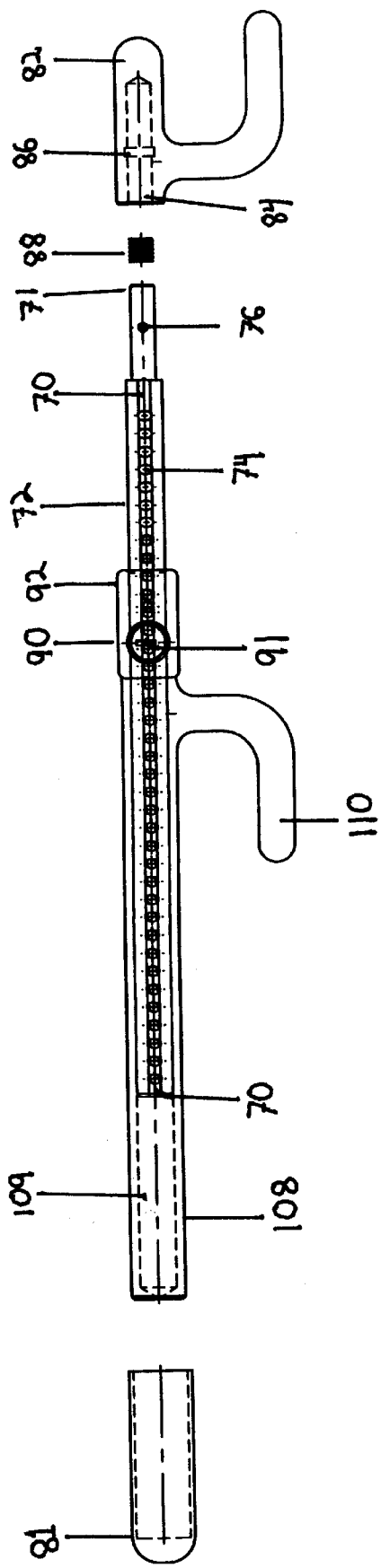
FIG. 5 is a top view of the steering wheel locking device of the second preferred embodiment of the present invention.
Figure 6:
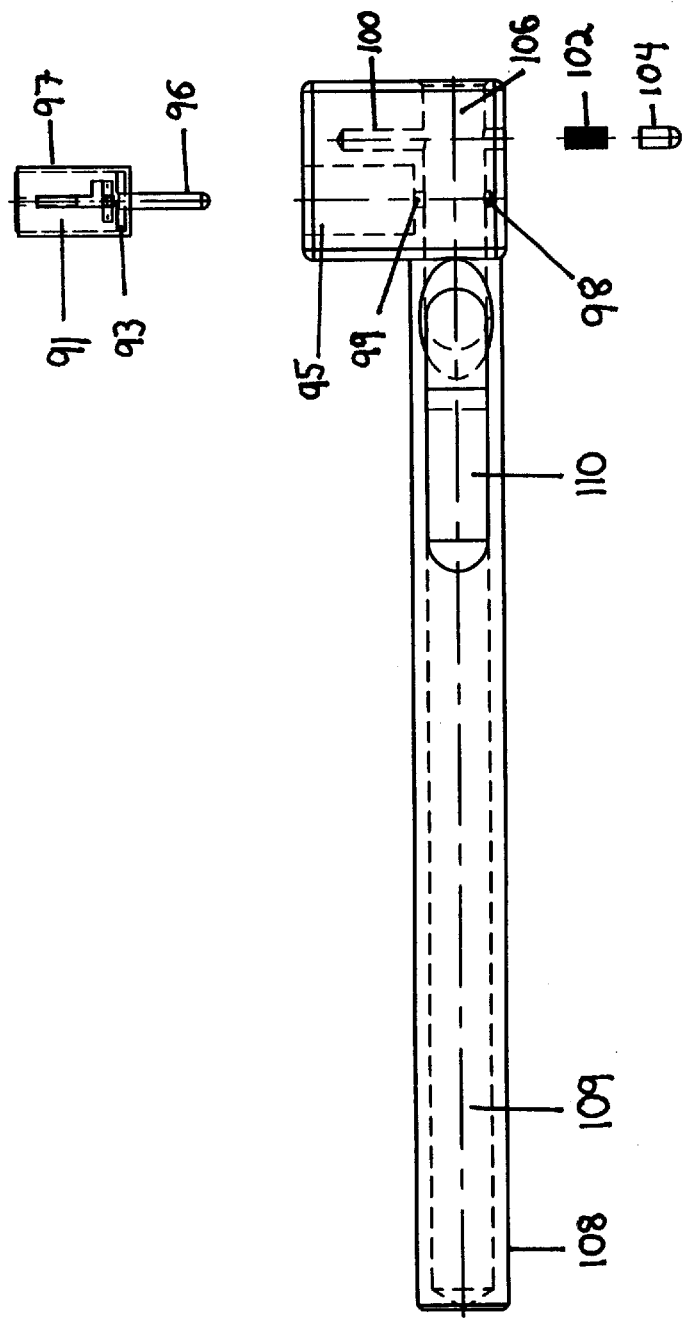
FIG. 6 is a side view of the steering wheel locking device of the second preferred embodiment of the present invention.

The second preferred embodiment of the present invention, as illustrated in FIG. 4, 5 and 6, utilizes a push to engage lock, described in detail below. Because the push to engage lock is ordinarily biased by an internal spring into an unlocked condition, a single longitudinal locking groove 70 provides both axial adjustment as well as lock alignment functions in this embodiment.

FIG. 4 illustrates an exploded view of an example of the second preferred embodiment of the present invention. Locking groove 70 is aligned along a longitudinal axis of lock rod 72. The lock is advantageously formed of a high strength steel alloy demonstrating superior hardness such as, for example, a chrome-steel alloy. Within locking grove 70, a plurality of dead bolt receiving holes 74 are positioned. Each adjacent receiving hole 74 forms a complete bore running diametrically through lock rod 72 and is located a consistent and equal distance, one from another. The receiving holes are located, at one terminus, centric and within the relatively greater diameter of locking groove 70—as compared to the relatively lesser diameter of the dead bolt receiving holes. Each receiving hole 74, at its intersection with the surface of the locking rod is advantageously chamfered in order to facilitate dead bolt engagement as well as to minimize the possibility of entrapment of skin during lock manipulation. Adjacent to the distal terminus 71 of the lock rod 72, a portion of said lock rod defines a relatively lesser diameter, as compared to the remainder of the lock rod. Within the reduced diameter of the rod, an assembly pin receiving bore 76 is provided for location of assembly pin 78. The bore 76 is open, at one terminus, at the surface of said lock rod, and closed at an opposite terminus. The assembly pin receiving bore is selected to have a diameter just slightly greater than assembly pin 78. An assembly pin spring 80 is provided and is positioned between the closed terminus of the assembly pin receiving bore and the pin. The assembly pin spring acts, in the absence of resistance, to urge the pin out from within the confines of the assembly pin receiving bore and beyond the surface of the lock rod. Rim engagement means 82 may be advantageously configured, for example, in a "u" shape or any other shape providing for engagement of a steering wheel rim from within its circumference. Located at a proximal terminus of said rim engagement means is a lock rod receiving bore 84 which exhibits a diameter slightly greater than that of the distal terminus of lock rod 72 and which said lock rod receiving bore is centrically aligned and especially configured and adapted to allow coaxial assembly of the rim engagement means upon the lock rod. The receiving bore of the rim engagement means includes a circumferentially aligned assembly pin seating groove 86. The seating groove and assembly pin are especially configured and aligned so that, upon coaxial assembly of the lock rod within said receiving bore, assembly pin 78 engages and is contained within groove 86 thereby providing 360 degrees of longitudinal rotation of said engagement means relative to said lock rod.

In preparation for coaxial assembly of the rim engagement means 83 upon the distal terminus of the lock rod 72, assembly pin 78 is fully depressed within the confines of its respective receiving bore compressing the assembly pin 80 thereby presenting no extension beyond the surface of the lock rod. Thereafter, upon seating of the proximal portion of said rim engagement means 82 upon the distal terminus of the locking rod 72 the assembly pin 78 seats within the assembly pin seating groove 86 located within the centrically aligned bore 84 of rim engagement means 82 so as to provide fixation of the rim engagement means to the locking rod, while simultaneously allowing 360 degree rotation thereof. The 360 degree freedom of rotation facilitates ease in engagement of the steering wheel rim. A spring 88 may be advantageously included and located between the distal terminus of the locking rod 72 and the rim engagement means so as to provide some resistance and control of excessive "free" spinning of the engagement means. The rim engagement means 82 is also, advantageously formed of a high strength steel alloy. It is also advantageous to provide an elastic coating upon said means in order to minimize marring of the steering wheel.

In embodiments of the present invention utilizing a push-to-engage lock, a lock module 90 is provided comprising a housing 92, push to engage lock 94, cylinder bore 95, dead bolt 96, bolt operation bore 99, extension bore 98, indexing bore 100, indexing pin 102, indexing spring 104 and lock rod bore 106. The bolt operation bore 96 provided for the dead bolt 96 within the lock housing 92 is contiguous with the larger diameter cylinder bore 95. The cylinder bore is especially configured to receive the push-to-engage lock 94. The push-to-engage lock 94 is comprised of a locking cylinder 91, spring 93 and sheath 97. The sheath 97 is permanently affixed to the walls of bore 95 so that a distal terminus of the sheath, opposite to that proximate to the dead bolt 96, is substantially flush with an outside surface of the lock housing. In an "unlocked" condition, the push-to-engage lock cylinder 91 is biased out, from within said sheath, by the internal lock spring 93. A set pin prevents the cylinder from complete extrusion from the sheath. At a proximal terminus of the cylinder, a means is provided for fixation of the dead bolt in alignment with a longitudinal axis of, and centric with the lock cylinder. At an opposite distal terminus of the cylinder, a key way is provided for keyed operation is provided.

Extending from and integral with one side of the lock housing is an extension rod 108. The extension rod is advantageously configured to extend a sufficient distance from said housing so as to provide an interference function with fixed objects within the vehicle such as, for example, a vehicle dash board, wind shield or console. Lock rod 72 and extension rod 108 are centrically as well as axially aligned and, accordingly, the central bore 109 of the extension rod, is axially aligned with the lock rod bore 106. Within extension rod 108 the central bore 109 demonstrates a diameter, substantially the same as the lock rod bore 106 running through the lock housing 92, and both said bores demonstrate a diameter slightly greater than that of the lock rod 72. Thus, a continuous bore defined by the lock rod bore and central bore of the extension rod, allow coaxial passage and axial adjustment of the length of lock rod 72 within the lock housing and extension rod.

A rim engagement means 110 is located upon, an integral with the extension rod 108. The engagement means may be configured, for example, in a "hook-like" shape so as to facilitate engagement of a steering wheel rim from within said rims diameter.

As discussed above, embodiments of the present invention, such as the second preferred embodiment, utilizing a push-to-engage locking cylinder utilize only a locking groove 70 and do not require additional adjustment grooves. In such embodiments, the locking groove serves adjustment, indexing and locking functions.

The push-to-engage lock, in the unlocked position, utilizes the internal spring to bias the cylinder, and affixed dead bolt, away from the lock rod bore 100 as well as the parallel diametric bolt receiving holes 74 of the lock rod 72. Therefore, when the push-to-engage lock is in the unlocked position, the lock rod may freely move along its longitudinal axis, through the housing bore and through the extension rod without risking premature engagement of the dead bolt with a receiving hole.

Embodiments utilizing a push-to-engage lock also include, within the lock housing, an indexing bore 100 located adjacent and circumferentially aligned with the dead bolt bore 95. The distance between the indexing bore and dead bolt bore is selected to be equal to the distance between adjacent dead bolt receiving holes 74 of the lock rod 72. Within the indexing bore, an indexing pin 102, with a diameter slightly less than that of the locking groove 70, and slightly greater than that of the dead bolt receiving holes 74 is positioned adjacent the housing bore. An indexing spring 104 is located at a distal terminus of the indexing bore and positioned so as to urge the indexing pin towards the lock rod bore. A stop may be provided at a proximal terminus of the bore adjacent to the lock rod bore so as to prevent escape of the indexing pin. The indexing pin 102 provides an audible "click" upon engagement about the orifice of a receiving hole, thus providing a simple and useful guide for proper dead bolt alignment.

In preparing the second prepared embodiment of the present invention utilizing push-to-engage locks for operation, the medial terminus of the lock rod 72 is first passed through lock rod bore 106 passing completely through the lock housing and through the central bore 109 of the extension rod 108. Placement of the locking rod into and through the housing requires the push-to-engage lock to be in the open position, the cylinder extending away from the housing. The lock rod is circumferentially aligned so that the locking groove is aligned with the indexing pin and lock bore. Just prior to application to a steering wheel to be secured, the lock 72 rod is axially retracted through the housing so as to provide minimal distance between the rim engagement means 110 and 82. Thereafter, a portion of the steering wheel rim is engaged, from within its circumference, by the rim engagement means affixed to the extension rod 108. The locking rod, whose dead bolt receiving holes are held in circumferential alignment with the dead bolt bore, may then be extended so as to allow engagement of a diametric portion of the steering wheel by the rim engagement means affixed thereto. Upon achieving a proper engagement of the rim, the lock rod is axially extended and retracted a short distance so as to allow the indexing pin to partially drop into an aligned receiving hole causing an audible click. Thereafter, the push to engage lock cylinder is depressed driving the dead bolt through the locking rod for secure locking thereof. The steering wheel lock is thus securely locked to the steering wheel.

The terms and expressions which have been employed in the foregoing specification are used therein as terms of description and not limitation, and there is no intention, in the use of such terms and expressions, of excluding equivalents of the features shown and described or portions thereof, it being recognized that the scope of the invention is defined and limited only by the following claims.

We claim:

1. A vehicular steering wheel lock comprised of:
   a lock rod including at least one longitudinally aligned locking groove within and upon the surface thereof, a steering wheel rim engagement means for engagement of a steering rim within a circumference defined thereby, said engagement means being rotatably mounted upon a distal terminus of said lock rod, a plurality of circumferentially aligned dead bolt receiving holes passing diametrically through said lock rod, each of said holes having equal diameters and being spaced equally apart, one end of said dead bolt receiving holes being positioned and located within said at least one longitudinally aligned locking groove;
   a lock module comprised of a housing, a dead bolt, a dead bolt extension spring, a dead bolt retraction means, a keyed lock cylinder, wherein said lock housing defines and includes a lock receiving port, a lock rod bore and a lock exit port, said ports and bore being contiguous with each other and running completely through said housing;
   an extension rod especially configured and adapted for mounting upon said lock housing, including therewithin a central bore having a diameter equal to that of said lock rod bore and being axially aligned therewith and said extension rod also having a wheel engagement means as an integral part thereof wherein a steering wheel lock is provided wherein at least one of said steering wheel engagement means is fully rotatable thereby for facilitating placement thereof while simultaneously utilizing an internal dead bolt located within said lock housing which, in a locked condition, is extended completely through and locked into position within said diametric locking holes in order to provide maximum resistance to forced removal.

2. The steering wheel lock of claim 1 wherein said lock rod includes at least one additional longitudinally aligned groove.

3. The steering wheel lock of claim 2 wherein said at least one additional longitudinally aligned groove is an adjustment groove.

4. The steering wheel lock of claim 3 wherein said locking groove and adjustment groove define a diameter greater than the diameter of the dead bolt receiving holes.

5. The steering wheel lock of claim 4 wherein said lock rod includes one longitudinally aligned locking groove and two longitudinally aligned adjustment grooves, said adjustment grooves being parallel and located on opposite sides of said locking groove.

6. The steering wheel lock of claim 1 wherein said lock rod includes, at a distal portion thereof, a section having a reduced diameter less than that of the remainder of said lock rod and an assembly pin receiving bore located within said distal portion of said lock rod;
   a proximal portion of said steering wheel engagement means rotatably mounted upon said lock rod defines a central bore therewithin especially configured and adapted for coaxial receipt of said distal portion of said lock rod having a reduced diameter, said central bore of said engagement means including a circumferentially aligned assembly pin groove therewithin;
   an assembly pin and assembly pin spring especially configured and adapted for placement within said assembly pin bore; wherein, upon coaxial insertion of said distal portion of the lock rod having reduced diameter within the central bore of said rim engagement means, said assembly pin bore and groove align thereby allowing said assembly spring and pin to provide a rotatable mounting of said engagement means upon said lock rod.

7. The steering wheel lock of claim 1 wherein said dead bolt is operated by means of a push-to-engage lock.

8. The steering wheel lock of claim 1 wherein one rim engagement means is rotatably mounted upon the lock rod and the other rim engagement means is affixed directly to the lock housing.

9. A vehicular steering wheel lock comprised of:
   a lock rod including at least one longitudinally aligned locking groove within and upon the surface thereof, a steering wheel rim engagement means for engagement of a steering rim within a circumference defined thereby, said engagement means being rotatably mounted upon a distal terminus of said lock rod, a plurality of circumferentially aligned dead bolt receiving holes diametrically passing through said lock rod, each said hole having equal diameters and being spaced equally apart, one end of said receiving holes being positioned and located within said at least one longitudinally aligned locking groove;
   a lock module comprised of a housing, a dead bolt, a dead bolt extension spring, a dead bolt retraction means, a keyed lock cylinder, wherein said lock housing defines and includes a lock receiving port, a lock rod bore and a lock exit port, said ports and bore being contiguous with each other and running completely through and across said housing;
   an extension rod especially configured and adapted for mounting upon said lock housing and including therewithin a central bore having a diameter equal to that of said lock rod bore and being axially aligned therewith a mounting means, and a wheel engagement means as an integral part thereof, said extension rod including a longitudinally aligned bore therewithin having a diameter equal to that of said receiving port, lock bore and exit port and especially configured and adapted for coaxial receipt of said lock rod there within, wherein a steering wheel lock is provided having a fully rotating steering wheel engagement means for facilitation of placement while simultaneously utilizing an internal dead bolt located within said lock housing for maximum resistance to forced removal.

10. The steering wheel lock of claim 9 wherein said lock rod includes at least one additional longitudinally aligned groove.

11. The steering wheel lock of claim 10 wherein said at least one additional longitudinally aligned groove is an adjustment groove.

12. The steering wheel lock of claim 11 wherein said locking groove and adjustment groove define a diameter greater than the diameter of the dead bolt receiving holes.

13. The steering wheel lock of claim 12 wherein said lock rod includes one longitudinally aligned locking groove and two longitudinally aligned adjustment grooves, said adjustment grooves being parallel and located on opposite sides of said locking groove.

14. The steering wheel lock of claim 1 wherein said lock rod includes, at a distal portion thereof, a section having a reduced diameter in relation to the remainder of said lock rod and an assembly pin receiving bore located within said distal portion of said lock rod;

a proximal portion of said steering wheel engagement means rotatably mounted upon said lock rod defines a central bore therewithin especially configured and adapted for coaxial receipt of said distal portion of said lock rod having a reduced diameter, said central bore of said engagement means including a circumferentially aligned assembly pin groove therewithin;

an assembly pin and assembly pin spring especially configured and adapted for placement within said assembly pin bore; wherein, upon coaxial insertion of said distal portion of the lock rod having reduced diameter within the central bore of said rim engagement means, said assembly pin bore and groove align thereby allowing said assembly spring and pin to provide a rotatable mounting of said engagement means upon said lock rod.

15. The steering wheel lock of claim 10 wherein said dead bolt is operated by means of a push-to-engage lock.

16. The steering wheel lock of claim 1 wherein said extension rod is rotatably mounted upon the housing of said lock module.

* * * * *